United States Patent [19]

Snyder

[11] 4,135,179

[45] Jan. 16, 1979

[54] ELECTRICAL TEMPERATURE SENSING DEVICE

[75] Inventor: Paul V. Snyder, Whitehall, Pa.

[73] Assignee: General Electric Company, Bridgeport, Conn.

[21] Appl. No.: 802,423

[22] Filed: Jun. 1, 1977

[51] Int. Cl.² ............................................. H01C 7/02
[52] U.S. Cl. .................................... 338/28; 338/25; 338/256; 338/268; 338/270; 338/302
[58] Field of Search ................................ 338/23–26, 338/28, 243, 256, 268, 270, 307; 73/362 AR; 29/612, 613; 99/331; 219/521

[56] References Cited

U.S. PATENT DOCUMENTS

| | | | |
|---|---|---|---|
| 2,149,448 | 3/1939 | Lederer et al. | 338/28 |
| 2,549,211 | 4/1951 | Lamm | 338/270 X |
| 2,581,213 | 1/1952 | Spooner, Jr. | 338/26 |
| 2,588,014 | 3/1952 | Knudsen | 338/28 |
| 2,946,974 | 7/1960 | Sias | 338/28 |
| 3,546,654 | 2/1969 | Rogal et al. | 338/268 |

Primary Examiner—C. L. Albritton
Attorney, Agent, or Firm—Carlos Nieves; George R. Powers; Leonard J. Platt

[57] ABSTRACT

An electrical temperature sensing device for food heating appliances such as toasters and the like which is constructed to provide rapid thermal response, significant resistance variation as a function of temperature, and good mechanical strength so as to be suitable for mounting within the food heating compartment of said appliances in close thermal coupling with the bread or other food article to be heated. The temperature sensing device is in the form of an elongated tubular structure shaped in a U configuration, comprising a central core of low mass insulating material upon which is wound a helical wire of temperature sensitive resistance material. A thin walled sleeve of insulating material fits tightly over the wire wound core, and a thin walled metal tubing of good heat conduction characteristics fits tightly over the insulating sleeve.

7 Claims, 5 Drawing Figures

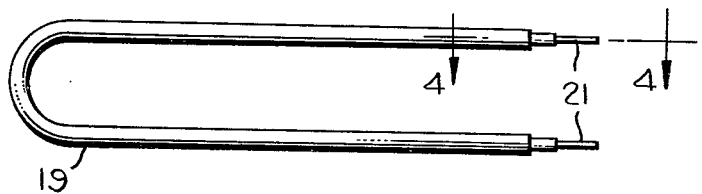
Fig. 3.
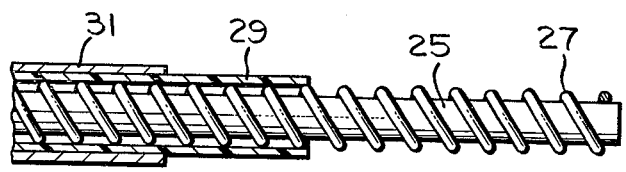
Fig. 4.
Fig. 5.
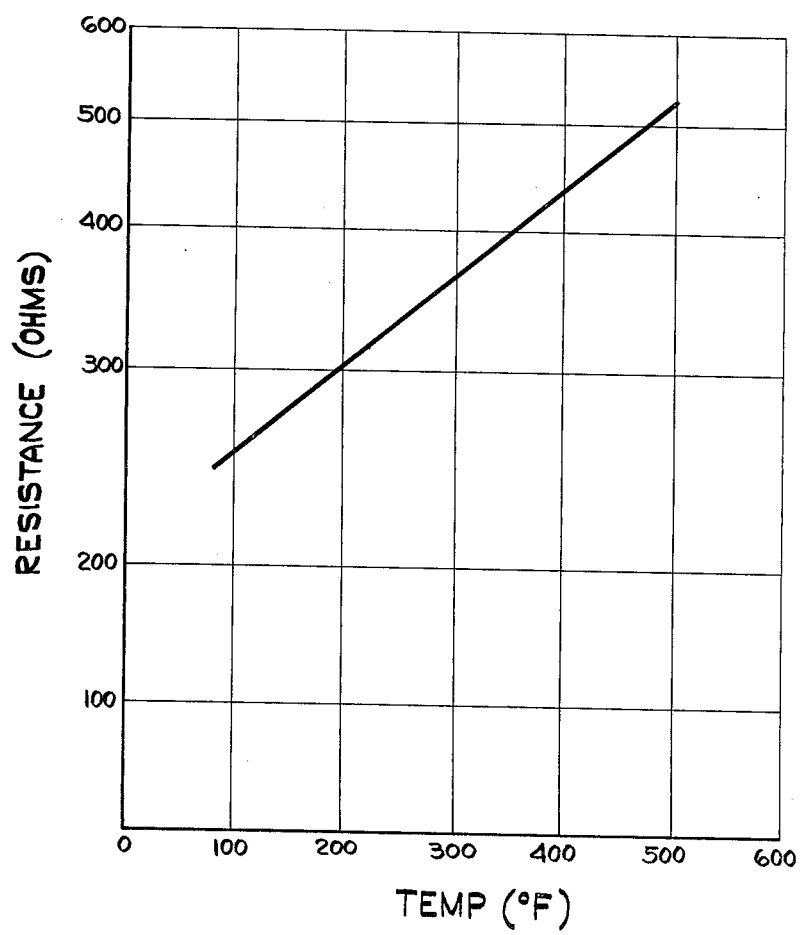

ELECTRICAL TEMPERATURE SENSING DEVICE

BACKGROUND OF THE INVENTION

The invention pertains to electrical temperature sensing devices of the type that exhibit a varying resistance characteristic as a function of temperature and, in particular, that are employed in food heating appliances for monitoring the heating operation. The variations in electrical resistance may be translated by appropriate circuit means into electrical control and/or indicator signals. It is desirable that such devices possess good thermal response characteristics so as to closely track the heating and cooling sequences that occur in food heating appliances and provide accurate resistance variations in response to temperature change. Another desirable property is that they have mechanical strength appropriate for mounting and use within food heating compartments.

One common temperature sensing device is the bead thermistor. This device consists of a bead of semiconductor material exhibiting a negative temperature coefficient of resistance, the bead being fixed between two straight wire leads for reducing the resistance between these wire leads as the temperature increases. Due to the mass of its body, the device does not have thermal response characteristics adequate for responding to rapid heating and cooling occurrences. In addition, a device of this type is not suitable for mounting within a food heating appliance.

There are a number of different constructions of temperature sensing devices having the sensor element in the form of a temperature sensitive resistance wire wound about an insulating core member, and having an outer enclosure. It is common to electrically insulate the wire element by coating the wire or embedding it in an insulating medium such as a refractory powder or a ceramic cement. However, for devices that are dimensioned for good thermal response this form of construction provides inadequate insulation. It is found that none of the existing devices of this kind optimumly combine the above noted properties of thermal response, temperature sensitive resistance and mechanical strength for application to food heating appliances such as toasters and the like.

SUMMARY OF THE INVENTION

It is accordingly an object of the invention to provide a novel electrical temperature sensing device that has rapid thermal response and relatively large resistance variation as a function of temperature for use in food heating appliances.

It is a further object of the invention to provide a novel electrical temperature sensing device as described above that is of relatively good mechanical strength suitable for mounting within a food heating compartment and which will withstand the rigors of use when thusly exposed.

It is another object of the invention to provide a temperature sensing device as described above that is of relatively simple and inexpensive construction.

Another object of the invention is to provide a novel temperature sensing device for toaster appliances and the like, that can be directly attached to the food support structure within the appliance so as to provide close and uniform thermal coupling with the food to be heated.

These and other objects of the invention are accomplished by a temperature sensing device in the form of an elongated tubular structure shaped in a U configuration, which includes a central core of low mass insulating material, such as fiberglass, having wound thereabout a helical wire of temperature sensitive resistance characteristics. Preferably, the material exhibits a resistivity and temperature coefficient of resistivity that are each relatively high for the generation of strong electrical signals in response to temperature change. A suitable material exhibiting these characteristics is a 70% nickel, 30% iron alloy. A thin walled sleeve of electrical insulating material, such as TFE Teflon, is fitted tightly over the wire wound core. Finally, a thin walled outer tubing of material exhibiting good thermal and mechanical properties, such as aluminum, is fitted tightly over the insulating sleeve. This structure provides rapid thermal conduction in the radial direction between said outer tubing and said wire and a relatively small heat sink for applied thermal energy, good electrical insulation of the temperature sensitive wire, and relatively good mechanical strength.

BRIEF DESCRIPTION OF THE DRAWING

While the specification concludes with the claims which particularly point out and distincly define that subject matter which is regarded as the invention, it is believed the invention will be more clearly understood when considering the following detailed description and the accompanying FIGURES of the drawing in which:

FIG. 3 is a top view of the inventive temperature sensing device;

FIG. 4 is a cross sectional view of a length of the temperature sensing device in FIG. 3 taken along the line 4—4; and FIG. 5 is a graph illustrating the change in resistance as a function of temperature for the inventive temperature sensing device.

DESCRIPTION OF THE PREFERRED EMBODIMENT

Figure 1:
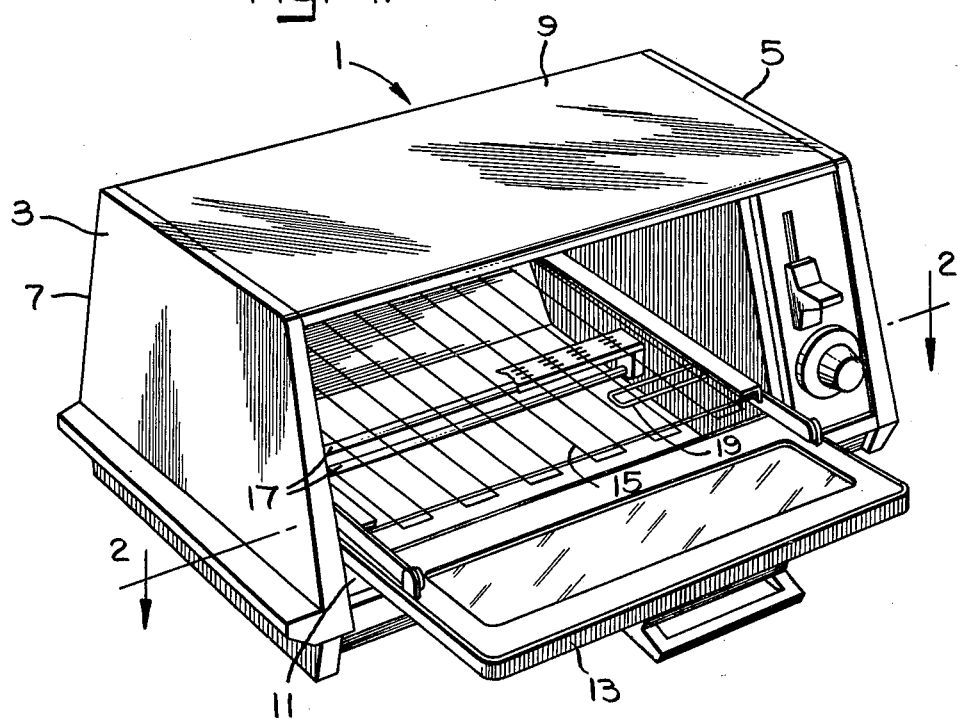
FIG. 1 is a perspective view of a toaster appliance in which is mounted the temperature sensing device of the present invention.

With reference to FIG. 1, there is illustrated a perspective view of a toaster appliance 1 which incorporates the electrical temperature sensing device of the present invention. The toaster 1 is a toaster oven type appliance having a single compartment providing the versatility of bake and broil operations in addition to being able to toast from one to several slices of bread. While the specific toaster oven appliance illustrated is presented principally for purposes of completing the disclosure of the invention, it should be appreciated that the present temperature sensing device has application to toaster appliances of various constructions as well as to other forms of food heating appliances.

The toaster appliance 1 is shown to include left and right side walls 3 and 5, respectively, a back wall 7, top and bottom surfaces 9 and 11 and a swing out door 13, shown in the open position. Rack support wires 15 support the food article to be heated. Heating is performed by parallel disposed rod heaters 17, of which there are two lower rods in the bottom region of the compartment and two similar upper rods in the top region of the compartment, the latter not appearing in the drawing.

Figure 2:
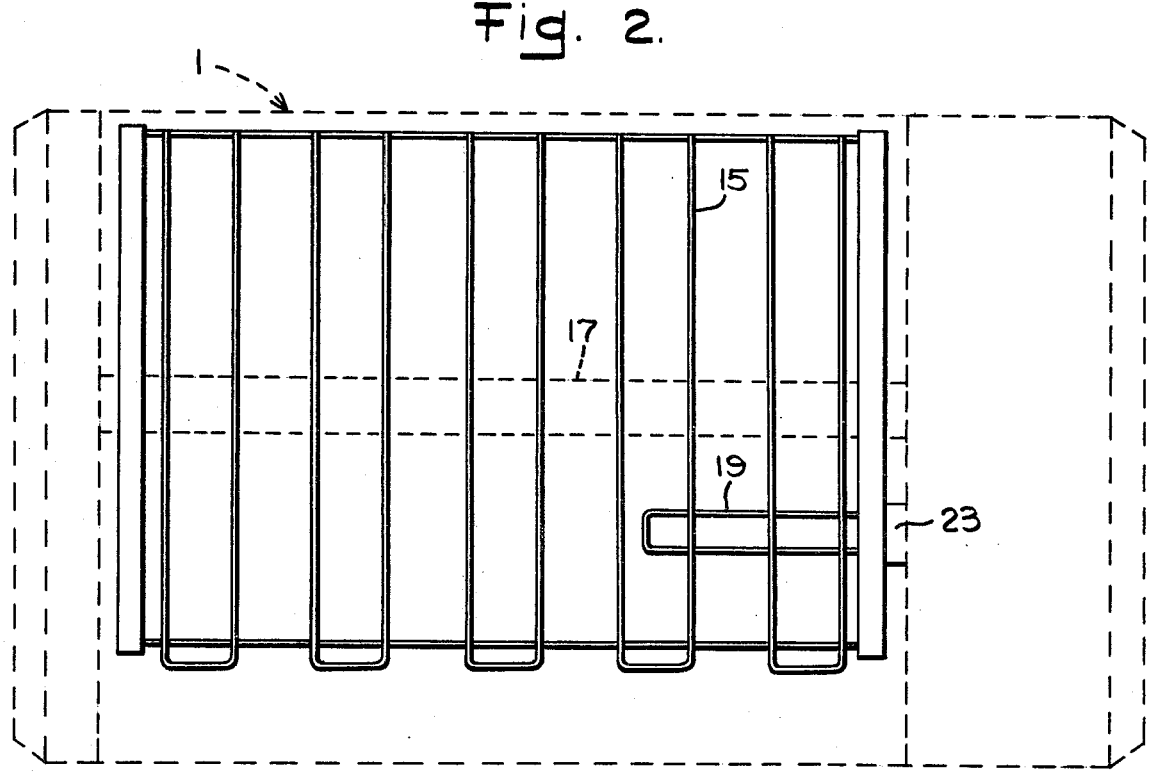
FIG. 2 is a cross sectional view, partially in dotted outline, of the toaster appliance in FIG. 1 taken along the line 2—2.

The temperature sensing device 19 of the present invention, which is an elongated tubular structure shaped in a U configuration, is fastened to the underside of the rack support wires 15, as more clearly shown in the cross-sectional view of FIG. 2, and thereby provides close thermal coupling to the bread or other food article that is placed on the rack 15. The sensing device has a pair of terminal pins 21, shown in FIG. 3, that insert into a socket 23 for conducting current through the device as a function of temperature. As will be described more fully, the temperature sensing device is constructed so as to provide rapid thermal response, and has a resistance and temperature coefficient of resistance that are each relatively high for generating strong electrical signals in response to temperature change. In addition, the device has the mechanical strength necessary for mounting and use within a food heating compartment. The device may be employed in a temperature sensing system such as disclosed in a copending application for U.S. Letters Patent of Robert J. Salem entitled "Electronic Temperature Sensing System for Toaster Appliances", filed concurrently herewith and assigned to the assignee of the present application. It may also be used in other forms of temperature sensing systems requiring the generation of electrical signals as a function of temperature.

Referring to FIGS. 3 and 4, there is shown in detail the construction of temperature sensing device 19. Included is a central core 25 of low mass insulating material, such as fiberglass, about which is wound a helix 27 of temperature sensitive resistance wire composed of a material whose electrical resistivity is a substantially linear function of temperature over a given range of temperatures. A particularly suitable material is a 70% nickel, 30% iron alloy which is sold under the trademark "Balco". This material exhibits a positive temperature coefficient of resistivity, and exhibits one of the highest resistivities and temperature coefficients of resistivity known for this type of material. Another suitable material of similar characteristics is tungsten. The end portions of the helix 27 are exposed to form the terminal pins 21.

Fitting tightly over the helix is a thin walled sleeve 29, having a wall thickness of on the order of 0.01 inches and less, of electrical insulating material of high dielectric strength, such as that sold under the trademark "TFE Teflon". Another suitable insulating material is that sold under the trademark "Kapton". Fitting tightly over the sleeve 29 is a thin walled metal tubing 31, such as of aluminum or copper, which in addition to its excellent thermal conduction properties provides the device with a measure of structural strength. It is important to provide a very small spacing between the insulating sleeve 29 and the helix and between the sleeve and metal tubing 31, on the order of 0.005 inches and less, in order to achieve a low impedance thermal path from the outer surface of the tubing to the helix wire.

In accordance with one operable embodiment of the invention the overall length of the device 19 is about seven and one-half inches with one-half inch separating the legs of the U. The terminal pins are each about one-quarter inch long. The central core 25 has a diameter of 0.034 inches and the wire 27 has a diameter of 0.002 inches. The wire helix is wound tightly onto the core with a pitch of approximately four. In the construction, the temperature sensitive resistance wire is wound about a continuous length of the central core by a conventional winding machine. The helix wound core is then cut to length, each piece fitted with an insulating sleeve and metal tubing and then the device bent into the U configuration. The insulating sleeve 29 has a thickness of 0.006 inches, with the air gap between the sleeve and the helix of about 0.0025 inches. The metal tubing, which is preferably of black color for greater heat absorption, has a thickness of 0.004, with the air gap between the tubing and sleeve of also about 0.0025 inches, providing an overall outside diameter of the device of 0.068 inches. It is noted that these diameters are intended to be primarily exemplary and not limting of applicant's invention. It may also be appreciated that the device can be shaped into other configurations for providing the requisite resistance and thermal coupling characteristics, such as a "W" or "O" configuration.

The small air gaps of 0.0025 inches can be further reduced by employing a swaging operation in the fabrication of the device. Utilizing this fabrication technique, long lengths of the total structure are formed, for example, on the order of twenty foot lengths. These lengths are then radially compressed, such as by means of reducing die, so as to bring the metal tubing and insulating sleeve substantially into contact along their curved adjacent surfaces, and to bring the insulating sleeve substantially into contact with the curved surface of the wire helix. The devices are then cut to length, stripped at the ends to form the terminal pins and shaped.

In another fabrication technique for reducing the air gaps employing a planishing operation, the shaped device can be axially compressed, such as by a pair of platens, to provide a flattened structure that is positioned within the heating compartment with the flattened or planar surfaces orthogonal to the direction of thermal energy radiation. The metal tubing and insulating sleeve are thus brought substantially into contact along their two pair of adjacent planar surfaces, and the insulating sleeve and helix wire are brought substantially into contact along their two pair of adjacent planar surfaces.

There are conflicting requirements in obtaining good thermal, electrical and mechanical properties for the device 19. From the standpoint of thermal properties it is required to have good thermal response so as to track temperature changes closely and accurately. This requires a device exhibiting good thermal conduction between the heat source and the temperature sensitive element. It also requires a device of relatively low mass that will be a poor means of thermal energy storage. On the other hand, the size and mass of the device are normally directly related to its ability to provide the resistance necessary for generating strong electrical signals as a function of temperature, and to provide good electrical insulation. Similarly, the device's mechanical strength is normally dependent upon size and mass. The unique structure of the present device strikes a balance among these various requirements so as to achieve optimum thermal, electrical and mechanical properties and to make the device eminently suited for application to a food heating appliance.

A radial path of low thermal impedance is provided from the heated surface of the metal tubing 31 through the tubing and insulating sleeve 29 to the helix by virtue of the thin walled construction of these components and the extremely small air gap separating them from each other and from the helix 27. In the examplary embodiment considered, the total path length is about 0.015 inches. Further, the fiberglass core 25 is a low mass material and of sufficiently small diameter so as to act as a poor heat sink. This construction permits the temperature sensitive wire to accurately respond to rapid temperature changes with a very low response time, on the order of one second or less.

The resistance of the helix is determined by the resistivity of the wire and the dimensions of the helix. Thus, in the embodiment under consideration the Balco wire has a resistance of 30 ohms per foot. Having a 0.002 inch diameter and being wound with a pitch of approximately four on a 0.034 diameter core seven and one-half inches in length, there is provided a total resistance at room temperature of about 250 ohms. This resistance increases substantially linearly with temperature, reaching a value of about 525 ohms at 500° F., as shown by the graph in FIG. 5.

While the invention has been disclosed in specific detail for purposes of clarity and complete disclosure, the appended claims are intended to include within their meaning all modifications and changes that come within the true scope of the invention.

What I claim as new and desire to secure by Letters Patent of the United States is:

1. A temperature sensing device comprising:
   (a) a central elongated core of low mass insulating material,
   (b) a helical wire of temperature sensitive wound about said core,
   (c) a thin-walled sleeve of electrical insulating material fitted over the wire-wound core so as to have a gap of less than 0.005 between said sleeve and the helical wire, and
   (d) a thin-walled tubing of material exhibiting good thermal and mechanical properties fitting over said insulating sleeve so as to provide a gap of less than 0.005 between said tubing and sleeve.

2. A temperature sensing device as in claim 1 which is fabricated through the employment of a swaging operation.

3. A temperature sensing device as in claim 1 wherein said insulating sleeve has a wall thickness of less than 0.01 inches.

4. A temperature sensing device as in claim 3 wherein said temperature sensitive resistance material is a 70% nickel, 30% iron alloy.

5. A temperature sensing device as in claim 4 wherein the insulating sleeve material is "TFE Teflon".

6. A temperature sensing device as in claim 5 wherein said tubing is composed of aluminum.

7. A temperature sensing device as in claim 6 wherein said core is composed of fiberglass.

* * * * *

UNITED STATES PATENT AND TRADEMARK OFFICE
CERTIFICATE OF CORRECTION

PATENT NO. : 4,135,179
DATED : January 16, 1979
INVENTOR(S) : Paul V. Snyder

It is certified that error appears in the above-identified patent and that said Letters Patent are hereby corrected as shown below:

Col. 2 - Line 26: distincly should read -- distinctly --.

Col. 4 - Line 13: diameters should read -- dimensions --.

Signed and Sealed this

*Eleventh* Day of *December 1979*

[SEAL]

*Attest:*

SIDNEY A. DIAMOND

*Attesting Officer*     *Commissioner of Patents and Trademarks*